(12) United States Patent
Takamura et al.

(10) Patent No.: US 9,321,456 B2
(45) Date of Patent: Apr. 26, 2016

(54) HYBRID VEHICLE CONTROL DEVICE

(71) Applicant: NISSAN MOTOR CO., LTD., Yokohama-shi, Kanagawa (JP)

(72) Inventors: Yutaka Takamura, Yokohama (JP); Hiroyuki Ashizawa, Yokohama (JP); Munetoshi Ueno, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/653,045

(22) PCT Filed: Nov. 21, 2013

(86) PCT No.: PCT/JP2013/081363
§ 371 (c)(1),
(2) Date: Jun. 17, 2015

(87) PCT Pub. No.: WO2014/103571
PCT Pub. Date: Jul. 3, 2014

(65) Prior Publication Data
US 2015/0329104 A1 Nov. 19, 2015

(30) Foreign Application Priority Data
Dec. 26, 2012 (JP) ................. 2012-281902

(51) Int. Cl.
*B60W 20/00* (2006.01)
*B60K 6/48* (2007.10)
(Continued)

(52) U.S. Cl.
CPC .................. *B60W 20/40* (2013.01); *B60K 6/48* (2013.01); *B60K 6/547* (2013.01); *B60L 11/14* (2013.01); *B60L 11/1862* (2013.01); *B60L 15/2054* (2013.01); *B60W 10/02* (2013.01); *B60W 10/06* (2013.01); *B60W 10/08* (2013.01);
(Continued)

(58) Field of Classification Search
CPC ...... B60W 20/00; B60W 10/00; B60K 11/00; B60K 17/00; Y02T 90/00; B60L 11/00
See application file for complete search history.

(56) References Cited

U.S. PATENT DOCUMENTS 8,725,333 B2 * 5/2014 Akebono et al.
8,738,205 B2 5/2014 Steuernagel et al.
(Continued)

FOREIGN PATENT DOCUMENTS

JP 2007-069817 A 3/2007
JP 2007-307995 A 11/2007
(Continued)

*Primary Examiner* — Thomas Tarcza
*Assistant Examiner* — Alex C Dunn
(74) *Attorney, Agent, or Firm* — Foley & Lardner LLP

(57) ABSTRACT

Provided is a control device for a hybrid vehicle, capable of suppressing a drive torque variation during engine start control. The hybrid vehicle has an engine (Eng) and a motor/generator (MG). The control device has: an engine start control part that performs engine start control to start the engine (Eng) from an EV mode by increasing a motor rotation speed of the motor/generator (MG), while allowing slippage of a second clutch (CL2), and bringing a first clutch (CL1) into slip engagement; and a drive torque upper limit setting part (600) that sets a drive torque upper limit value (Tdrlim) in the EV mode based on an added motor rotation speed (Nad), which is given by adding an additional rotation speed (N+) to the motor rotation speed (Nmot), as an upper limit of a drive torque transmitted to drive wheels through the second clutch CL2.

5 Claims, 16 Drawing Sheets

(51) Int. Cl.
  *B60K 6/547*   (2007.10)
  *B60L 11/14*   (2006.01)
  *B60W 10/02*   (2006.01)
  *B60W 10/06*   (2006.01)
  *B60W 10/08*   (2006.01)
  *B60L 11/18*   (2006.01)
  *B60L 15/20*   (2006.01)

(52) U.S. Cl.
  CPC ........ *B60L2240/12* (2013.01); *B60L 2240/421* (2013.01); *B60L 2240/423* (2013.01); *B60L 2240/441* (2013.01); *B60L 2240/443* (2013.01); *B60L 2240/507* (2013.01); *B60L 2240/547* (2013.01); *B60L 2240/549* (2013.01); *B60L 2260/26* (2013.01); *B60W 2520/10* (2013.01); *B60W 2540/10* (2013.01); *B60W 2710/025* (2013.01); *B60W 2710/0666* (2013.01); *B60W 2710/081* (2013.01); *B60W 2710/083* (2013.01); *B60Y 2300/429* (2013.01); *Y02T 10/6221* (2013.01); *Y02T 10/6286* (2013.01); *Y10S 903/93* (2013.01)

(56) References Cited

U.S. PATENT DOCUMENTS

| | | | |
|---|---|---|---|
| 2009/0143189 | A1* | 6/2009 | Hasegawa et al. |
| 2009/0143950 | A1* | 6/2009 | Hasegawa et al. |
| 2010/0298092 | A1* | 11/2010 | Tsuchikawa |
| 2012/0130579 | A1 | 5/2012 | Steuernagel et al. |
| 2013/0124026 | A1* | 5/2013 | Ueno et al. |
| 2013/0311027 | A1* | 11/2013 | Toyota; Ryohey |
| 2014/0180521 | A1* | 6/2014 | Tsuchikawa; Haruhisa |

FOREIGN PATENT DOCUMENTS

| | | |
|---|---|---|
| JP | 2007-331534 A | 12/2007 |
| JP | 2008-044521 A | 2/2008 |
| JP | 2011-020543 A | 2/2011 |
| JP | 2012-086653 A | 5/2012 |
| JP | 2012-530012 A | 11/2012 |

* cited by examiner

|  |  | ROTATION SPEED [rpm] | | | |
|---|---|---|---|---|---|
| MOTOR POWER CONSUMPTION [kW] |  | Tmlim | ... | ... | ... |
|  |  | ... |  |  |  |
|  |  | ... |  |  |  |
|  |  | ... |  |  |  |
|  |  | ... |  |  |  |
|  |  | ... |  |  |  |
|  |  | ... |  |  |  |

HYBRID VEHICLE CONTROL DEVICE

FIELD OF THE INVENTION

The present invention relates to a control device for a hybrid vehicle and, more particularly, to a technique for controlling a drive torque of the hybrid vehicle before and after engine start control.

BACKGROUND ART

There is conventionally known a hybrid vehicle having a power train system in which an engine, a first clutch, a motor and a second clutch are arranged in series from the drive source side to the drive wheel side (see, for example, Patent Document 1).

This conventional hybrid vehicle is configured to, at the start of the engine, transmit a torque of the motor to the engine, while allowing slippage of the first clutch as well as allowing slippage of the second clutch, whereby a torque variation caused by the start of the engine would not be transferred to the drive wheel side.

In this conventional hybrid vehicle, the upper limit of a drive torque is set based on a torque upper limit value of the motor; and the torque upper limit value of the motor during EV mode driving and the torque upper limit value of the motor during engine start are set independently of each other.

PRIOR ART DOCUMENTS

Patent document

Patent Document 1: Japanese Laid-Open Patent Publication No. 2007-69817

SUMMARY OF THE INVENTION

Problems to be Solved by the Invention

The torque upper limit value of the motor is set based on a rotation speed of the motor. At the start of the engine, the rotation speed of the motor is increased while allowing slippage of the second clutch. As the torque upper limit value of the motor decreases with increase in the rotation speed of the motor, the upper limit of the drive torque becomes smaller during the engine start than that before the engine start. This leads to a decrease in drive torque.

The present invention has been made in view of the foregoing circumstances. It is an object of the present invention to provide a control device for a hybrid vehicle, capable of preventing a drive torque variation during engine start control.

Means for Solving the Problems

As a solution to the above problem, the present invention provides a control device for a hybrid vehicle, the hybrid vehicle comprising an engine, a motor and first and second clutches, the control device comprising: an engine start control part that performs engine start control to start the engine from an EV mode by, while allowing slippage of the second clutch, increasing a rotation speed of the motor and bringing the first clutch into slip engagement; and a drive torque upper limit setting part that sets a drive torque upper limit value in the EV mode based on an added motor rotation speed, which is given by adding an additional rotation speed to a rotation speed of the motor, as an upper limit of a drive torque transmitted to drive wheels through the second clutch.

Effects of the Invention

In the present invention, the drive torque upper limit setting part sets the drive torque upper limit value in the EV mode based on the added motor rotation speed, which is given by adding the additional rotation speed to the rotation speed of the motor, as the upper limit of the drive torque transmitted to the drive wheels.

This drive torque upper limit value set in the EV mode becomes smaller than that set based on the rotation speed of the motor without adding thereto the additional rotation speed.

Thus, the drive torque upper limit value set based on the rotation speed of the motor at the start of the engine can be prevented horn decreasing relative to the drive torque upper limit value set in the EV mode even though the rotation speed of the motor is increased at the start of the engine.

It is therefore possible to prevent a decrease in drive torque during the engine start control.

DESCRIPTION OF EMBODIMENTS

Hereinafter, the best mode for carrying out the present invention will be described below by way of the following exemplary embodiment with reference to the drawings.

(Embodiment 1)

A control device of a hybrid vehicle according to Embodiment 1 will he explained below under the following headings: "Power Train System Configuration", "Control System Configuration", "Configuration of Integrated Controller", "Integrated Control Operations", "Engine Start Control" and "Setting of Drive Torque Upper Limit".

[Power Train System Configuration]

First, an explanation will be given of the power train system configuration of the hybrid vehicle according to Embodiment 1.

Figure 1:
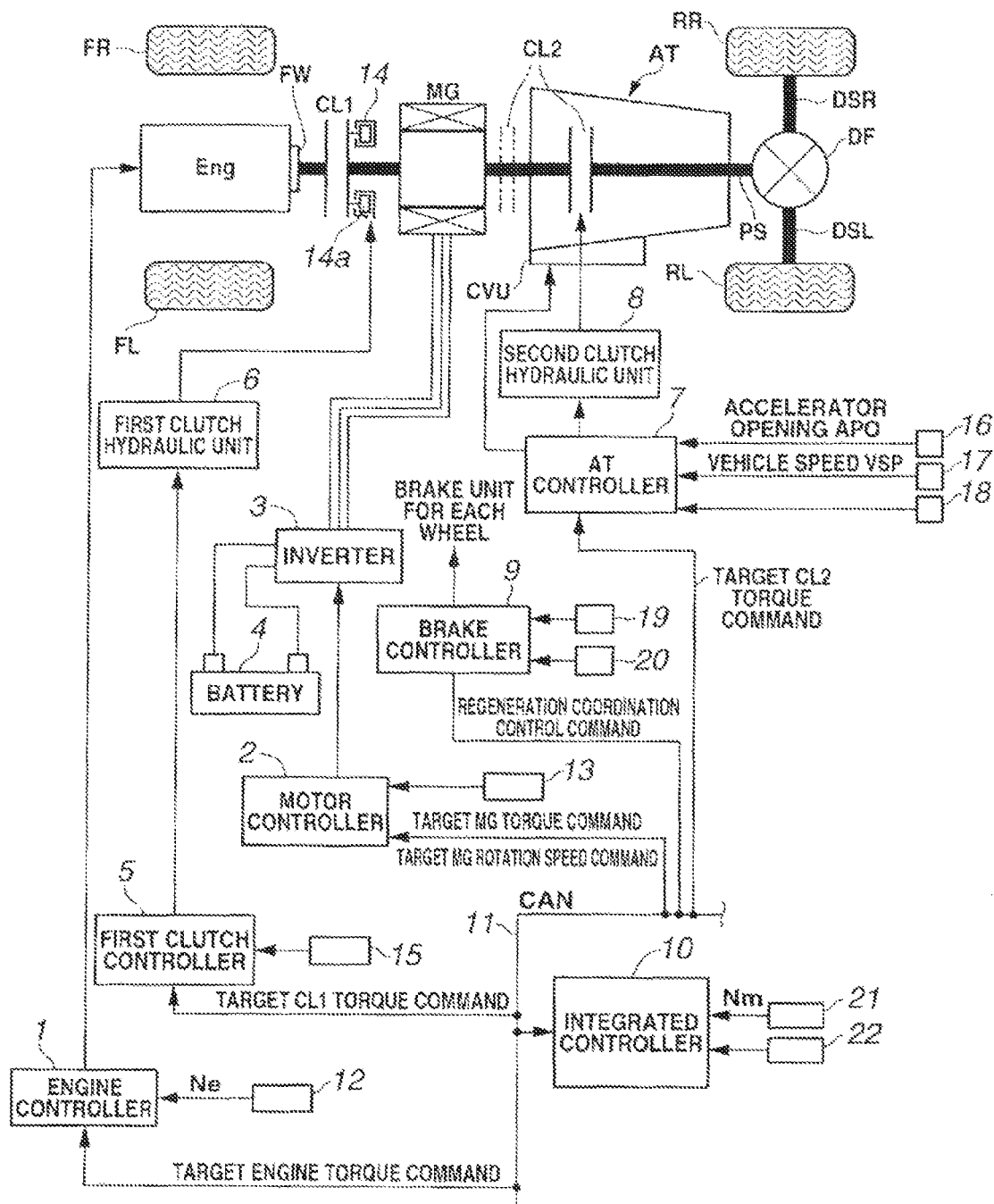
FIG. 1 is an overall configuration diagram of a hybrid vehicle provided as a rear-wheel-drive hybrid vehicle with a drive torque control device according to Embodiment 1.

FIG. 1 is an overall configuration diagram of the hybrid vehicle to which the drive torque control device according to Embodiment 1 is applied. The hybrid vehicle is herein adapted as a rear-wheel-drive hybrid vehicle.

As shown in FIG. 1, the power train system of the hybrid vehicle according to Embodiment 1 is provided with an engine Eng, a flywheel FW, a first clutch CL1, a motor/generator MG, a second clutch CL2, an automatic transmission AT, a propeller shaft PS, a differential gear DF, a left drive shaft DSL, a right drive shaft DSR, a left rear wheel RL (as a drive wheel), a right rear wheel RR (as a drive shaft), a left front wheel LF and a right front wheel FR.

The engine Eng is in the form of e.g. a gasoline engine or a diesel engine. Start control, stop control and throttle valve opening control of the engine Eng are performed under engine control commands from an engine controller 1. The flywheel FW is coupled to an output shaft of the engine Eng.

The first clutch CL1 is disposed between the engine Eng and the motor/generator MG. Engagement/disengagement, including semi-clutch state, of the first clutch CL1 is controlled according to a first clutch control hydraulic pressure of a first clutch hydraulic unit 6 under a first clutch control command from a first clutch controller 5. The first clutch CL1 is in the form of e.g. a wet single-plate clutch engaged or disengaged by a hydraulic actuator 14 with a piston 14a.

The motor/generator MG is in the form of e.g. a synchronous motor/generator having a rotor with a permanent magnet embedded therein and a stator with a stator coil wound thereon. Drive control of the motor/generator MG is performed according to a three-phase alternating current of an inverter 3 under a control command from a motor controller 2. The motor/generator MG serves as a motor rotated and driven with the supply of power from a battery 4 (hereinafter, this operation state will be referred to as "power running"). Further, the motor/generator MG serves as a generator to generate an electromotive force between terminal ends of the stator coil (hereinafter, this operation state will be referred to as "regeneration") upon the receipt of rotational energy from the engine Eng or the drive wheels. The rotor of the motor/generator MG is coupled to an input shaft of the automatic transmission AT through a damper.

The second clutch CL2 is disposed between the motor/generator MG and the Left and right rear wheels RL and RR. Engagement/disengagement, including slip engagement and slip disengagement, of the second clutch CL2 is controlled according to a second clutch control hydraulic pressure of a second clutch hydraulic unit 8 under a second clutch control command from an AT controller 7. The second clutch CL2 is in the form of e.g. a wet multi-plate clutch or wet multi-plate brake whose hydraulic fluid flow rate and hydraulic pressure can be continuously varied by a proportional solenoid.

Both of the first and second clutch hydraulic units 6 and 8 are accommodated in an AT hydraulic control valve unit assembly CVU that is located adjacent to the automatic transmission AT.

The automatic transmission AT is in the form of e.g. a stepped transmission that can be automatically shifted between multiple gear stages, such as five forward gear speeds and one reverse gear speed, based on a vehicle speed, accelerator opening and the like. The automatic transmission AT has a plurality of friction engagement elements to establish the respective gear stages. Among these friction engagement elements, any optimal clutch or brake on the torque transmission path, rather than a dedicated clutch, is selected and used as the second clutch CL2. It is alternatively feasible to dispose a dedicated clutch as the second clutch CL2 between the motor/generator MG and the automatic transmission AT or between the automatic transmission AT and the drive wheels (left and right rear wheels RL and RR) as indicated by two-dot chain lines in the drawing without using the friction engagement element of the automatic transmission AT.

An output shaft of the automatic transmission AT is coupled to the left and right rear wheels RL and RR through the propeller shaft PS, the differential gear DF, the left drive shaft DSL and the right drive shaft DSR.

[Control Device System Configuration]

Next, an explanation, will be given of the control system configuration of the hybrid vehicle according to Embodiment 1.

The control system of the hybrid vehicle according to Embodiment 1 is provided with the engine controller 1, the motor controller 2, the inverter 3, the battery 4, the first clutch controller 5, the first clutch hydraulic unit 6, the AT controller 7, the second clutch hydraulic unit 8, a brake controller 9 and an integrated controller 10 as shown in FIG 1. The engine controller 1, the motor controller 2, the first clutch controller 5, the AT controller 7, the brake controller 9 and the integrated controller 10 are connected through a CAN communication line 11 such that information can be exchanged between these controllers 1, 2, 5, 7, 9 and 10.

The engine controller 1 receives engine rotation speed information from an engine rotation speed sensor 12, a target engine torque command from the integrated controller 10 and any other required information and outputs a command to a throttle valve actuator etc. of the engine Eng for control of engine operation point (Ne, Te).

The motor controller 2 receives information about a rotor rotational position of the motor/generator MG from a resolver 13, target MG torque and rotation speed commands from the integrated controller 10 and any other required information and outputs a command to the inverter 3 for control of motor operation point (Nm, Tm) of the motor/generator MG. The motor/controller MG also monitors a battery SOC indicating a discharge capacity of the battery 4. The battery SOC is used as the information for control of the motor/generator MG and, at the same time, outputted to the integrated controller 10 through the CAN communication line 11.

The first clutch controller 5 receives a stroke position of the piston 14a of the hydraulic actuator 14 as sensor information from a first clutch stroke sensor 15, a target CL1 torque command from the integrated controller 10 and any other required information, and then, outputs a command to the first clutch hydraulic unit 6 of the AT hydraulic control valve unit assembly CVU for engagement/disengagement control of the first clutch CL1.

The AT controller 7 receives information from an accelerator opening sensor 16, a vehicle speed sensor 17 and the other sensor 18 (e.g. transmission input rotation speed sensor, inhibitor switch etc.). During D-range operation, the AT controller 7 determines the optimal gear stage depending on the position of its operation point defined by the accelerator opening APO and the vehicle speed VSP on a shift map, and then, outputs a control command to the AT hydraulic control valve unit assembly CVU for shifting to the determined optimal gear stage. In addition to such automatic transmission control, the AT controller 7 performs second clutch control upon receipt of a target CL2 torque command from the integrated controller 10 to output a command to the second clutch hydraulic unit 8 of the AT hydraulic control valve unit assembly CVU for engagement/disengagement control of the second clutch CL2.

Figure 8:
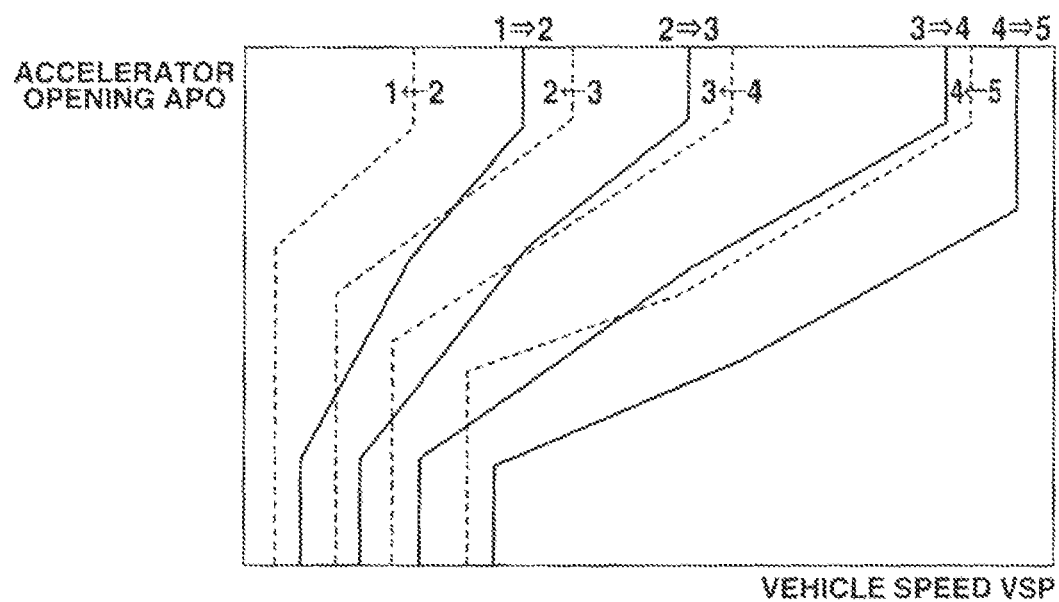
FIG. 8 is a shift map showing shift characteristics for control of an automatic transmission gear ratio by an AT controller in the drive torque control device of the hybrid vehicle according to Embodiment 1.
Figure 9:
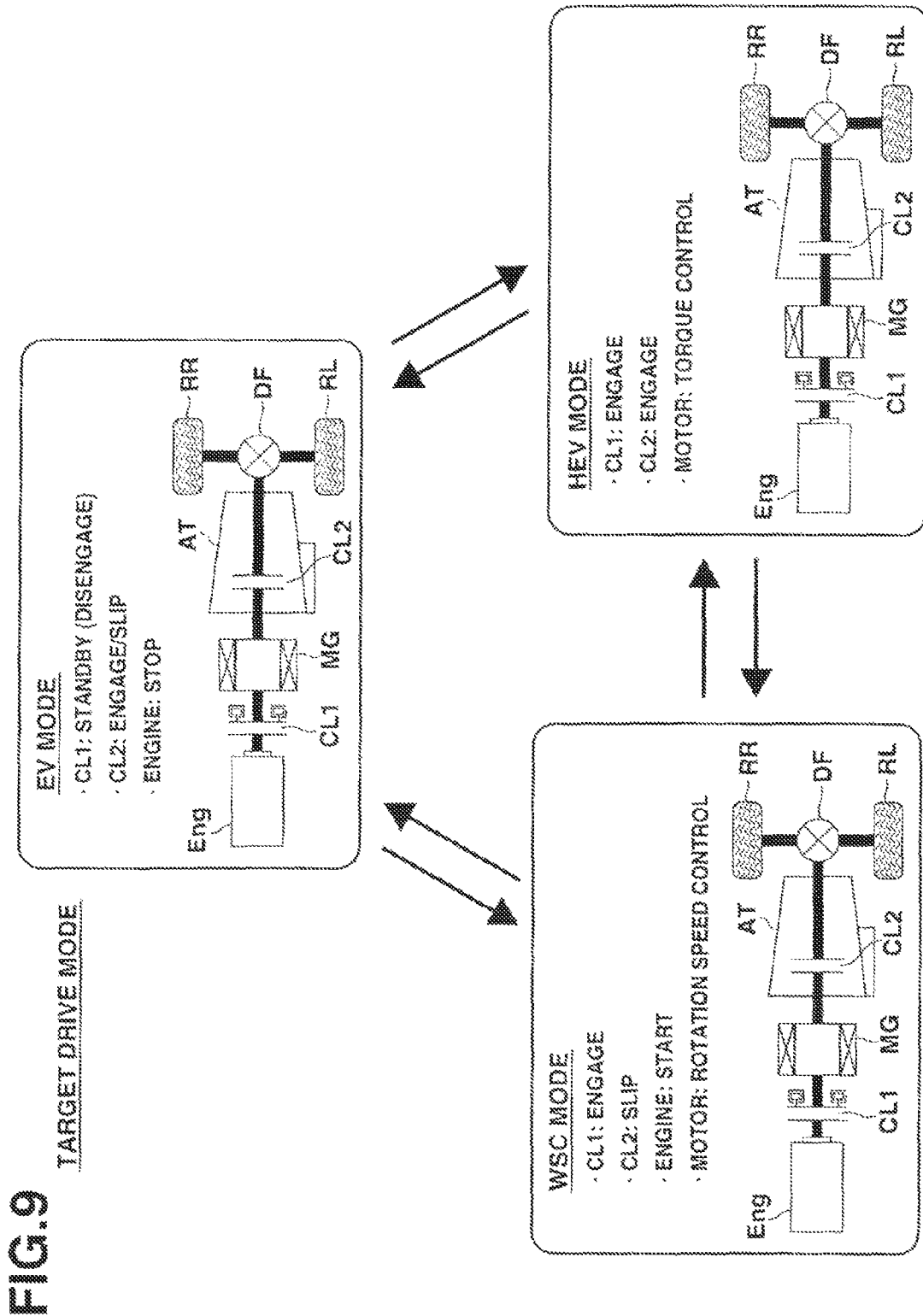
FIG. 9 is a target drive mode diagram showing examples of transition of a target drive mode in the drive torque control device of the hybrid vehicle according to Embodiment 1.

The shift map used herein refers to a map on which upshift lines and downshift lines are set according to the accelerator opening APO and the vehicle speed VSP. One example of the shift map is shown in FIG. 8.

The brake controller 9 receives wheel rotation speeds of the respective four vehicle wheels from a vehicle wheel speed sensor 19, a brake stroke BS from a brake stroke sensor 20, a regeneration coordination control command from the integrated controller 10 and any other required information and, in the case where a regenerative braking force is insufficient to meet the demand for a braking force responsive to the brake stroke BS during brake pedal depression braking, performs regeneration coordination control to apply a mechanical braking force (e.g. hydraulic braking force, motor braking force etc.) and thereby compensate for the insufficiency of the demand braking force.

The integrated controller 10 performs the function to manage the total energy consumption of the vehicle such that the vehicle can drive at the maximum efficiency. The integrated controller 10 receives a motor rotation speed Nmot of the motor/generator from a motor rotation speed sensor 21 and any other required information from the other sensor 22 and through the CAN communication line 11, and then, outputs the target engine torque command to the engine controller 1, the target MG torque and rotation speed commands to the motor controller 2, the target CL1 clutch command to the first clutch controller 5, the target CL2 clutch command to the AT controller 7 and the regeneration coordination control command to the brake controller 9.

[Configuration of Integrated Controller]

Figure 2:
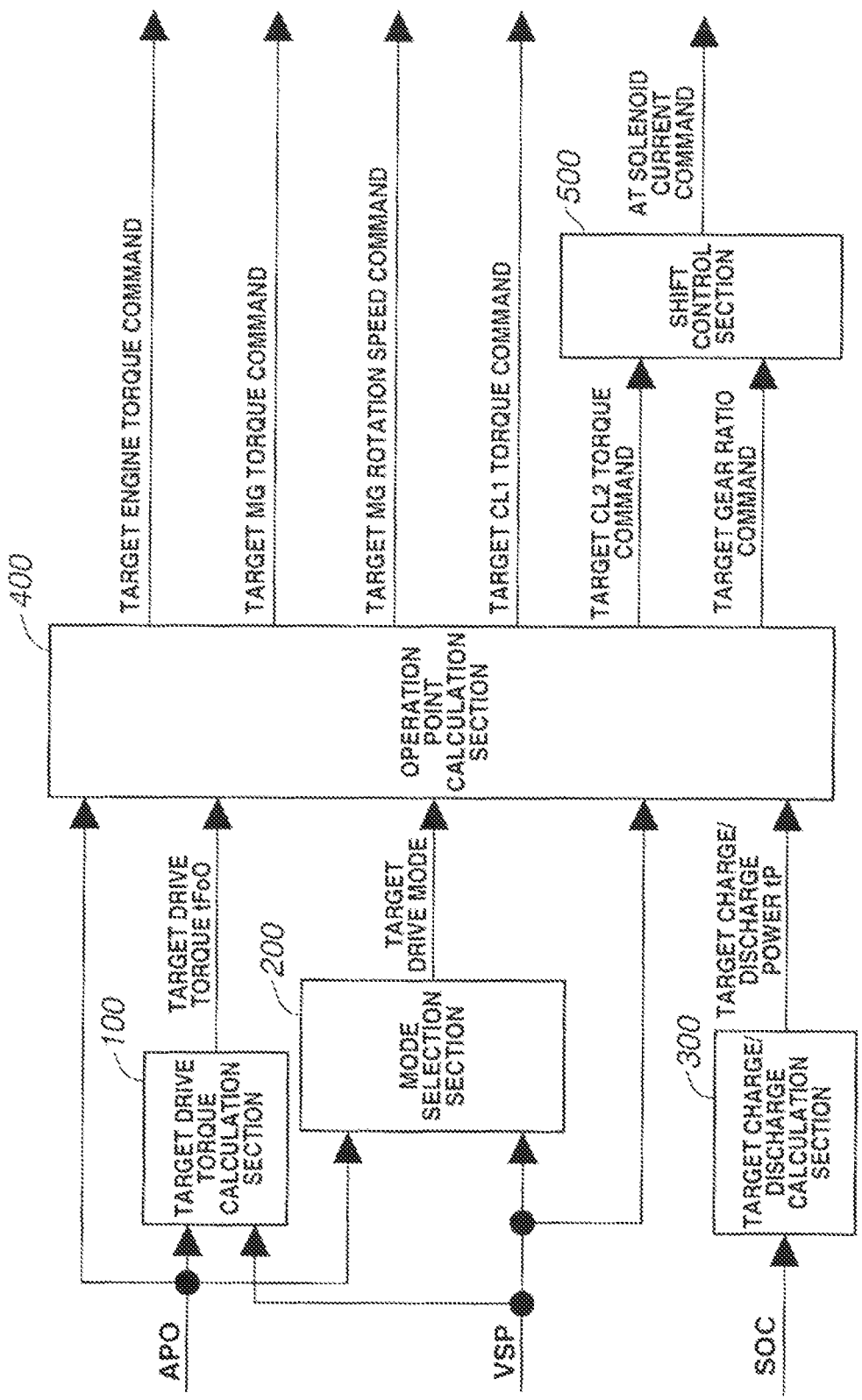
FIG. 2 is a control block diagram showing operations of an integrated controller in the drive torque control device of the hybrid vehicle according to Embodiment 1.
Figure 3:
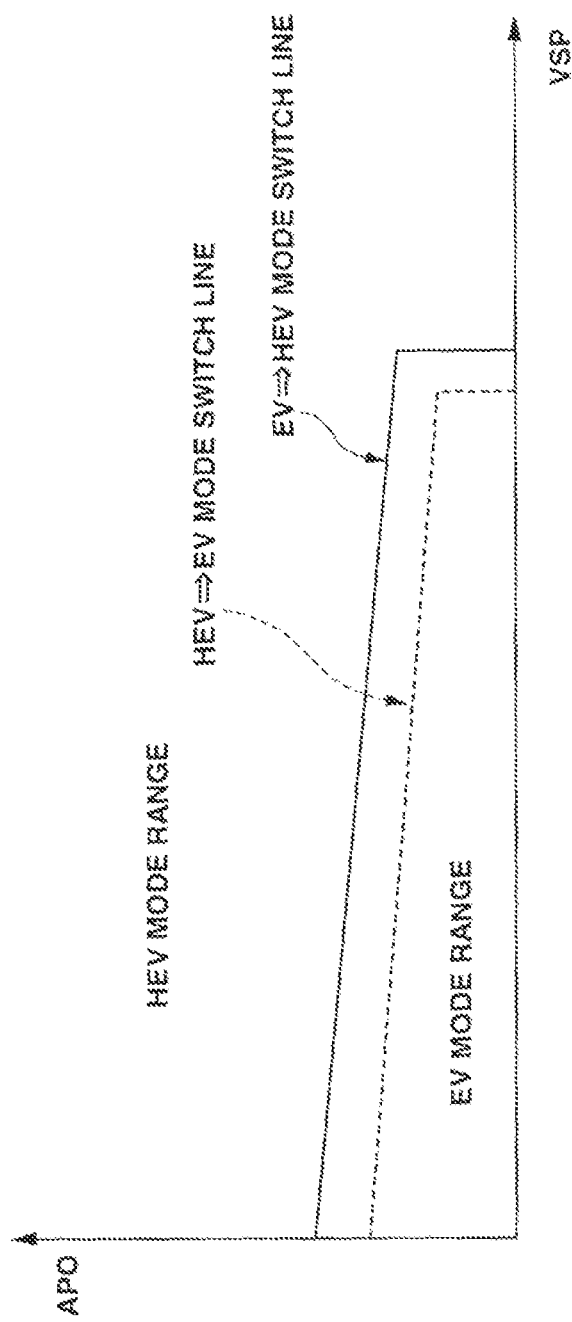
FIG. 3 is an EV-HEV selection map for drive mode selection operation of the integrated controller.

FIG. 2 is a control block diagram showing operations of the integrated controller 10 in the control device of the hybrid vehicle according to Embodiment 1 FIG. 3 is an EV-HEV selection map for drive mode selection operation of the integrated controller 10 in the hybrid vehicle. Hereinafter, the operations of the integrated controller 10 will be explained below with references to FIGS. 2 and 3.

As shown in FIG. 2, the integrated controller 10 has target drive torque calculation section 100, a mode selection section 200, a target charge/discharge calculation section 300, an operation point command section 400 and a shift control section 500.

Figure 4A:
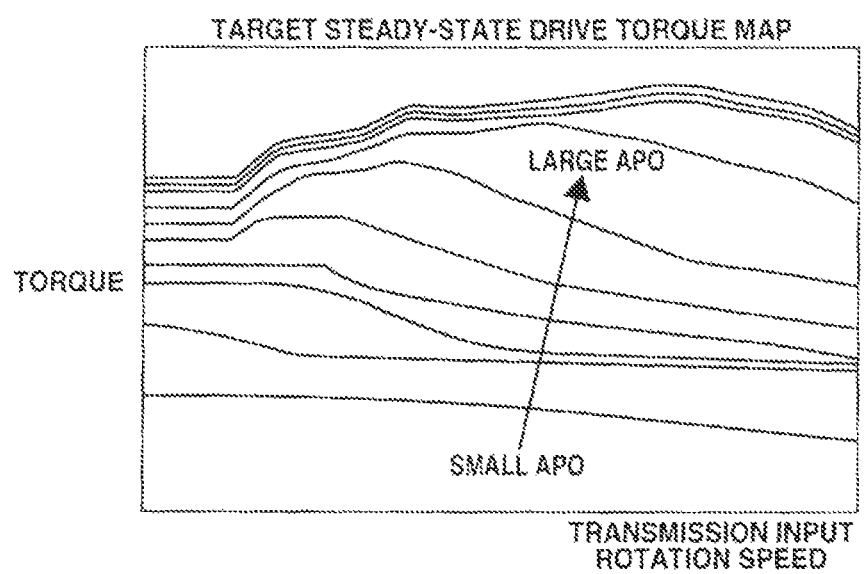
FIG. 4A is a drive force map showing target steady-state drive torque characteristics for calculation of a target drive torque by a target drive torque calculation section in the drive torque control device of the hybrid vehicle according to Embodiment 1 of the present invention.
Figure 4B:
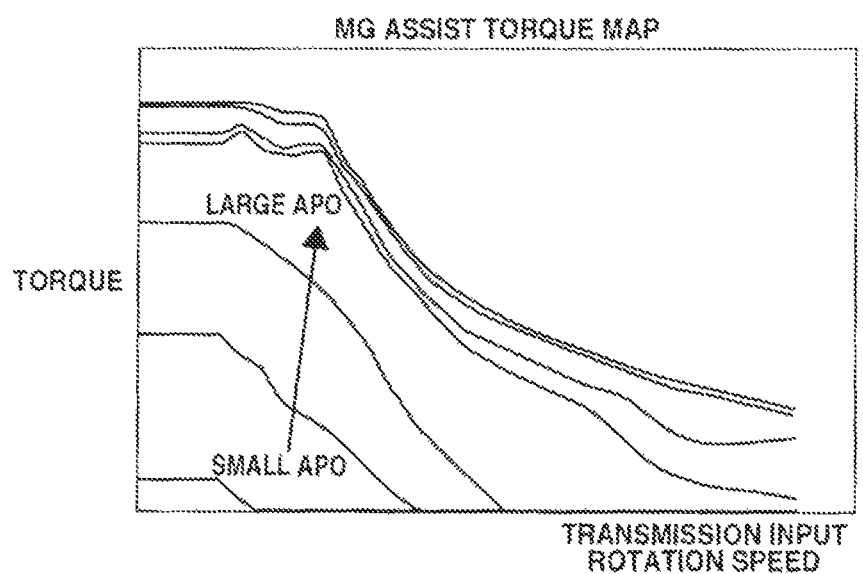
FIG. 4B is an assist torque map showing MG assist torque characteristics for calculation of a motor/generator assist torque by the target drive torque calculation section in the drive torque control device of the hybrid vehicle according to Embodiment 1.

The target drive torque calculation section 100 calculation a target steady-state drive torque and a MG assist based on the accelerator opening APO and the vehicle speed VSP with reference to a target steady-state drive torque map of FIG. 4A and a MG assist torque map of FIG. 4B, respectively.

Figure 5:
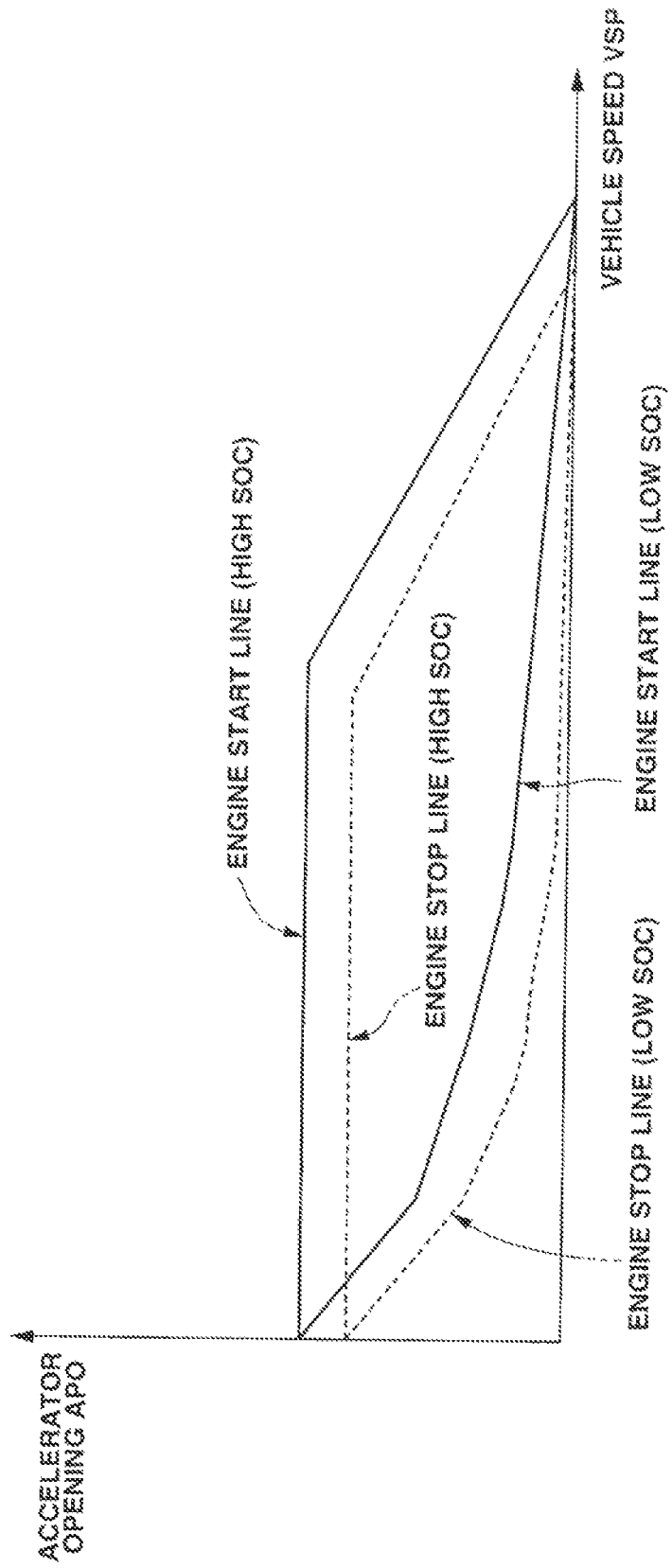
FIG. 5 is a range diagram showing an electric vehicle (EV) mode range and a hybrid electric vehicle (HEV) mode range of the drive torque control device of the hybrid vehicle according to Embodiment 1.

The mode selection section 200 selects an "EV mode" or an "HEV mode" as a target drive mode with reference to an engine start/stop line map of FIG 5. The engine start/stop line map used herein refers to a map on which engine start lines and engine stop lines are set according to the accelerator opening APO and the vehicle speed. The engine start lines and engine stop lines are lowered in a direction that the accelerator opening decreases as the battery SOC becomes lower.

Figure 6:
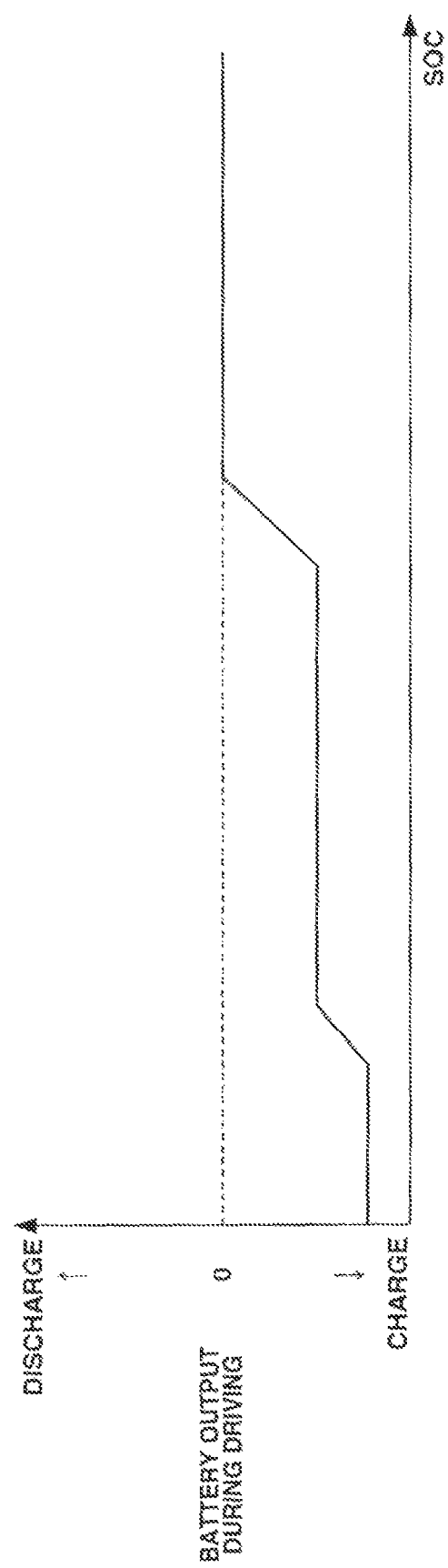
FIG. 6 is a characteristic diagram showing target charge/discharge characteristics with respect to a battery state-of-charge of the drive torque control device of the hybrid vehicle according to Embodiment 1.
Figure 7:
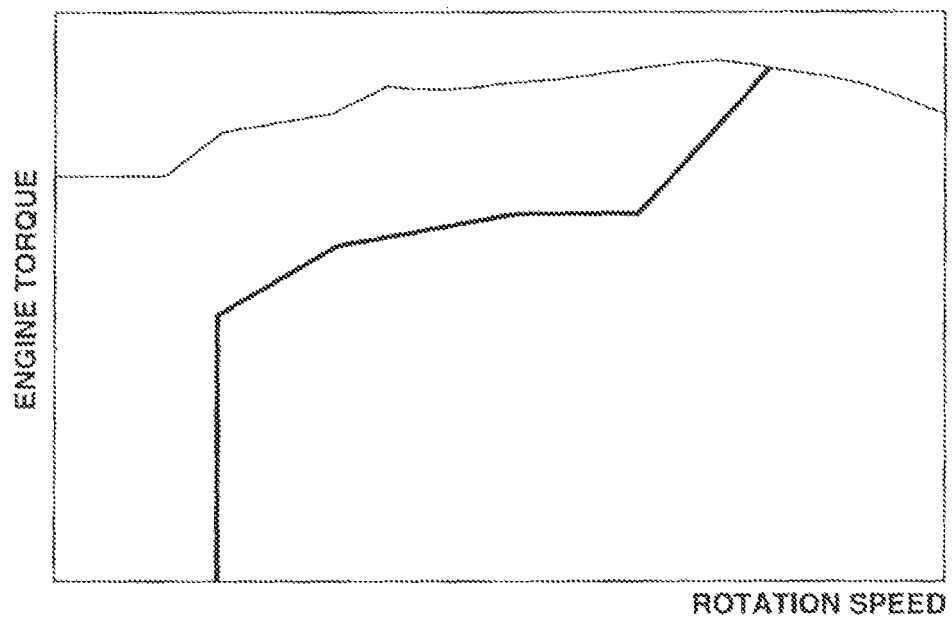
FIG. 7 is an engine torque increase diagram showing increase of an engine torque to a vehicle-speed-dependent optimal fuel efficiency line under the control of the drive torque control device of the hybrid vehicle according to Embodiment 1.

The target charge/discharge calculation section 300 calculates a target power output based on the battery SOC with reference to a power output demand map of FIG. 6. The target charge/discharge calculation section 300 also calculates a power output required to increase the engine torque from the current operation point to an optimal fuel efficiency line as indicated by a thick line in FIG 7. Then, the target charge/discharge calculation section 300 compares the calculated required power output with the target power output and add either lower one of the calculated required power output and the target power output as an output demand to the engine output.

The operation point command section 400 calculates, as target operation points, a transient target engine torque, a target MG torque, a target MG rotation speed, a target CL1 torque, a target CL2 torque and a target gear ratio based on the accelerator opening APO, the target drive torque tFo0, the MG assist torque, the target drive mode, the vehicle speed VSP and the target powder output (power output demand) tP. These calculation results are outputted to the controllers 1, 2, 5 and 7 through the CAN communication line 11.

The operation point command section 400 also executes engine start control.

More specifically, the mode selection section 200 switches from the EV mode to the HEV mode with engine start when the operation point, which is defined by combination of the accelerator opening APO and the vehicle speed VSP, intersects a EV→HEV mode switch line and enters into a HEV mode range during EV mode driving. The mode selection section 200 switches from the HEV mode to the EV mode with engine stop and disconnection when the operation point intersects a HEV→EV mode switch line and enters into a EV mode range during HEV mode driving.

In response to such drive mode selection, the operation point command section 400 initiates engine start control at the time the accelerator opening APO changes across the engine start line of FIG. 5 during the EV mode driving. In the engine start control, the toque capacity of the second clutch CL2 is controlled so as to achieve a semi-clutch state with slippage of the second clutch CL2. The engagement of the first clutch CL1 is started after confirming the start of slippage of second clutch 2. The engine rotation speed is then increased. When the engine rotation speed reaches a first-explosion-possible rotation speed, the engine Eng is actuated. The first clutch CL1 is brought into full engagement when the meter rotation speed and the engine rotation speed become close to each other. After that, the second clutch CL2 is locked up. By this, the hybrid vehicle shifts into the HEV mode.

The shift control section 500 performs drive control of the solenoid of the automatic transmission AT so as to achieve the target CL2 torque capacity and the target gear ratio. As shown in FIG. 8, the shift lines are defined. More specifically, the shift control section 500 judges the presence of a request for shift from the current gear stage to the next gear stage based on the vehicle speed VSP and the accelerator opening APO and enables shift operation of the automatic transmission by shift clutch control according to the shift request.

The above-configured integrated controller 10 has, as the drive modes, not only the EV mode and the HEV mode but also a WSC mode for transition between the EV mode and the HEV mode.

The EV mode refers to a mode in which the vehicle is driven only by drive force of the motor/generator MG. In this EV mode, the engine Eng is kept stopped; the first clutch CL1 is disengaged; and the second clutch CL2 is brought into engagement or slip engagement, whereby only the output torque of the motor/generator MG is transmitted to the left and right rear wheels RL and RR through the automatic transmission AT.

The HEV mode refers to a mode in which the vehicle is driven by drive force of the engine Eng and the motor/generator MG. In this HEV mode, both of the first and second clutches CL1 and CL2 are brought into engagement, whereby the output torque of the engine Eng and the output torque of the motor/generator MG are transmitted to the left and the right rear wheels RL and RR through the automatic transmission AT.

The WSC mode refers to a mode in which, while controlling the torque capacity of the second clutch CL2, the vehicle is started from the HEV mode upon shift from P or N range to D range or started from the EV mode or HEV mode in D range. In this WSC mode, the engagement state of the second clutch CL2 is maintained by rotation speed control of the motor/generator MG in such a manner as to adjust the transmission torque of the second clutch CL2 and attain the demand drive torque responsive to the vehicle driving conditions and driver's operation. As the second clutch CL2 is in slip engagement in the WSC mode, it is possible to absorb mode switching shook and take effective shock measures.

It is herein noted that "WSC" is an abbreviation of "Wet Start Clutch".

[Integrated Control Operations]

Figure 10:
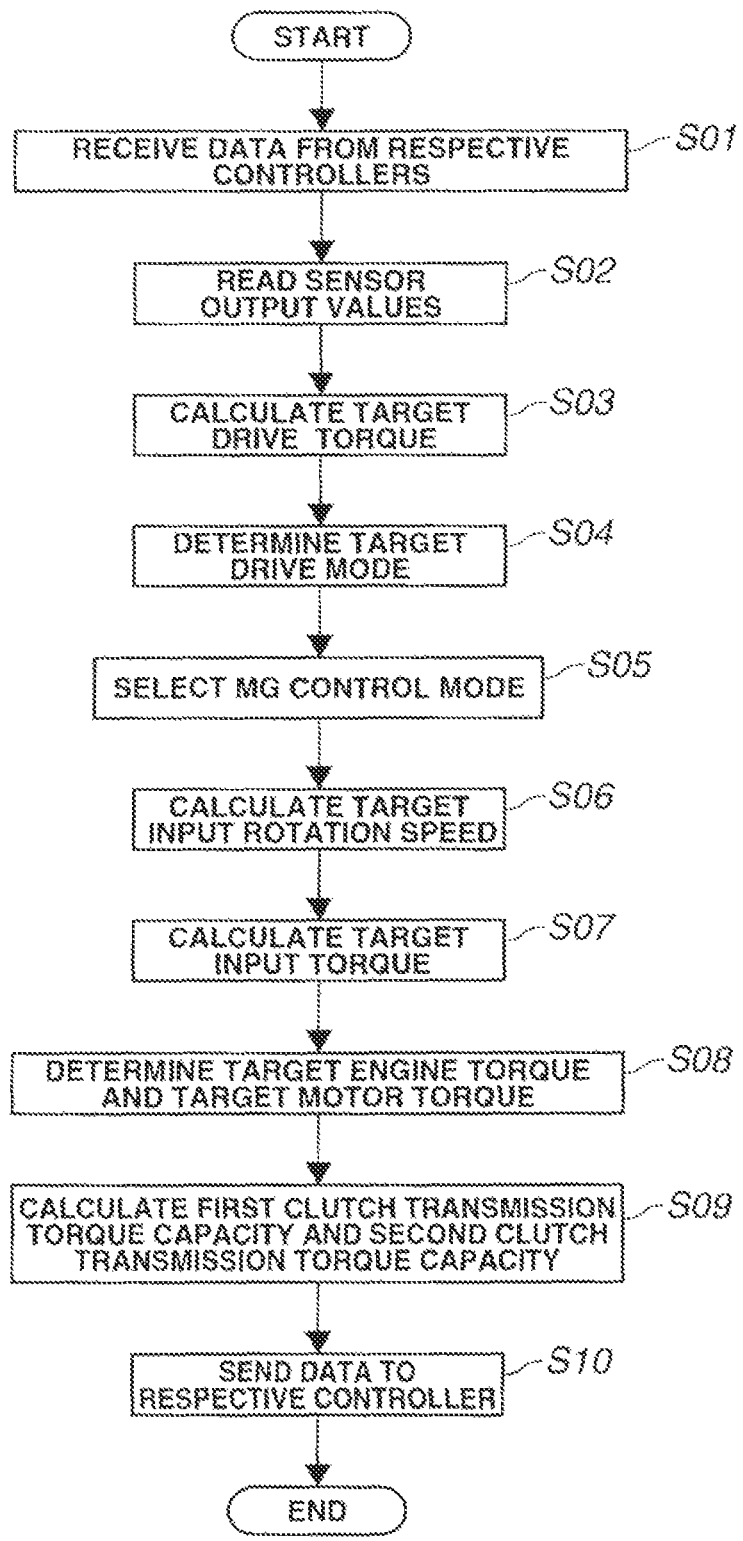
FIG. 10 is a flowchart for integrated control executed by the integrated controller 10 in the drive torque control device of the hybrid vehicle according to Embodiment 1.

FIG. 10 is a flowchart for integrated control executed by the integrated controller 10.

At step S01, the data is received from the respective controllers 1, 2, 5, 7 and 9. The control then proceeds to step S02.

The step S02, the sensor output values are read from the respective sensors 12 and 15 to 22. The control then proceeds to step S03.

Figure 11:
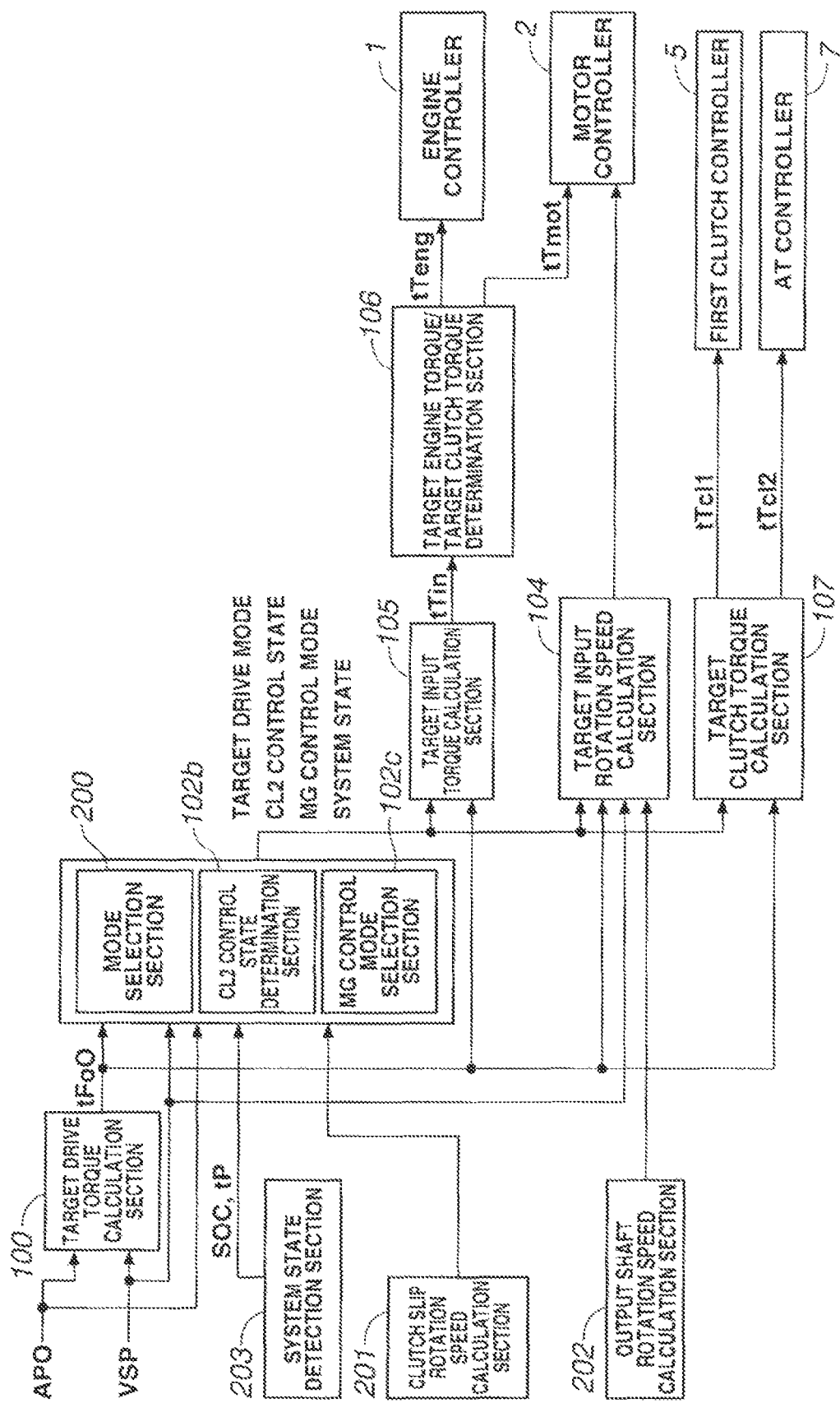
FIG. 11 a control block diagram of an integrated control execution module of the integrated controller.

At step S03, the target drive torque tFo0 is calculated based on the vehicle speed VSP, the accelerator opening APO and the braking force. The control then proceeds to step S04. As shown in FIGS. 2 and 11, the calculation of the target drive torque tFo0 is performed by the target drive torque calculation section 100.

Referring back to FIG. 10, at step S04, the target drive mode is determined based on the vehicle driving conditions such a target drive torque tFo0, battery SOC, accelerator opening APO, vehicle speed VSP and vehicle inclination with reference to the drive mode selection map of FIG. 3. As shown in FIGS. 2 and 11, the determination of the target drive mode is performed by the mode selection section 200 in consideration of the detection result of the system state detection section 203, such as battery SOC or target charge/discharge power tP, and the vehicle inclination.

Referring back to FIG. 10, at step S05, the control mode of the motor/generator MG (either a rotation speed control mode or a torque control mode) is selected according to the target drive mode determined at step S04. The selected control mode is outputted to the motor/controller MG. The control then proceeds to step S06. As shown in FIG. 11, The control mode selection of the motor/generator MG is performed by a MG control mode selection section 102c.

Referring back to FIG. 10, at step S06, the target input rotation speed is calculated based on the target drive mode determined at step S04, and the control mode of the motor/generator MG selected at step S05. The control then proceeds to step S07. As shown in FIG. 11, the calculation of the target input rotation speed is performed by a target input rotation speed calculation section 104.

Referring back to FIG. 10, at step S07, the target input torque tTin is calculated in view of the target drive torque tFo0 and various device protections. The control proceeds to step S08. As shown, in FIG. 11, the calculation of the target input torque tTin is performed by a target input torque calculation section 105. Then, the target engine torque tTeng and the target motor torque tTmot are determined by a target engine torque/target clutch torque determination section 106 as shown in FIG 11. The motor controller 2 outputs either one of the target motor rotation speed tNmot as the target input rotation speed of the motor/generator MG and the target motor torque tTmot depending on which of the torque control mode and the rotation speed control mode is selected as the control mode of the motor/generator MG by the MG control mode selection section 102c.

At step S08, the respective target engine and motor torque values are determined by torque distribution between the engine Eng and the motor/generator MG in view of the target input torque tTin calculated at step S07 and the power output demand. The control then proceeds to step S09.

At step S09, the target first clutch transmission torque capacity tTel1 and the target second clutch transmission torque capacity tTcl2 are calculated. The control then proceeds to step S10.

At step S10, the data is sent to the respective controllers 1, 2, 5, and 9. After that, the control proceeds to end.

As shown in FIG. 11, the target input tTin, the target engine and motor torques tTeng and tTmot and the target transmission torque capacities tTel1 and tTel2 are calculated by the target input torque calculation section 105, target engine torque/target clutch torque determination section 106 and a target clutch torque calculation section 107 at steps S07 to S09, respectively.

These calculations are performed based on the accelerator opening APO, the target drive torque tFoO, the target drive mode, the vehicle speed VSP, a clutch slip rotation speed determined by a clutch slip rotation speed calculation section 201, an output shaft rotation speed calculated by an output rotation speed calculation section 202, the target drive mode determined by the mode selection section 200, the clutch state such as slip state or full engagement state of the second clutch CL2 determined by a CL2 control state determination section 102b, the target charge/discharge power tP calculated by the MG control mode selection section 102c and the system state such as battery SOC obtained from the system state detection section 203.

[Engine Start Control]

Figure 12:
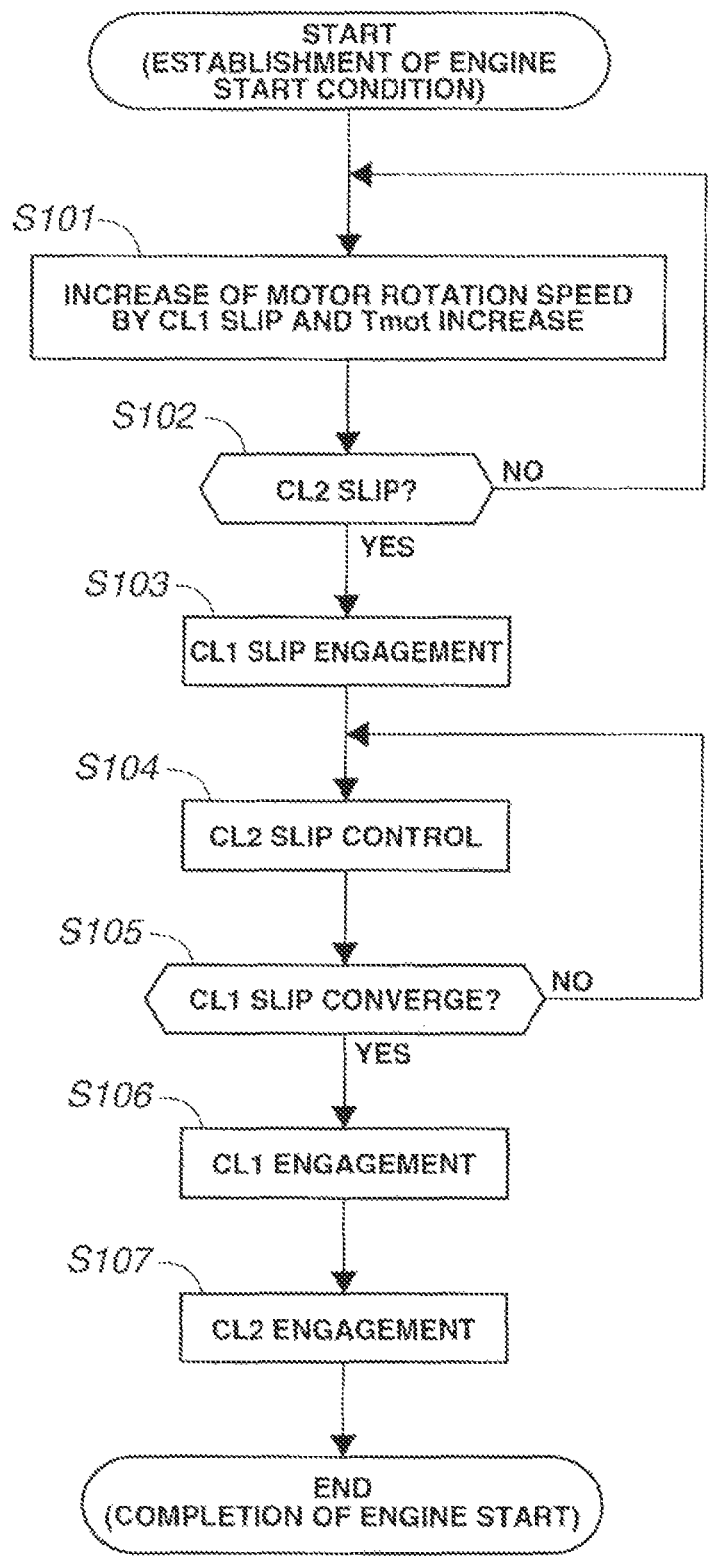
FIG. 12 is a flowchart for engine start control executed by an engine start control part of the integrated controller.

Next, a brief explanation will be given of the procedure of the engine start control executed by the engine start control part of integrated controller 10 with reference to the flowchart of FIG. 12.

As mentioned above, the engine start control is initiated at the time when the operation point defined by the accelerator opening APO and the vehicle speed VSP intersects the engine start line of FIG. 5.

At step S101, the motor rotation speed Nmot is increased by increasing the motor torque Tmot (target motor torque tTmot), that is, the output torque of the motor/generator MG while allowing slippage of the second clutch CL2. The control then proceeds to step S102.

At step S102, the occurrence of slippage of the second clutch CL2 is judged. The control proceeds back to step S101 when the slippage of the second clutch CL2 has not yet occurred. The control proceeds to step S103 when the slippage of the second clutch CL2 has occurred.

At step S103, the first clutch CL1 is brought into slip engagement so as to input an increase of the motor rotation speed Nmot to the engine Eng and accelerate the vehicle while cranking the engine Eng. The control then proceeds to step S104.

At step S104, the slip control is continued so as to maintain the slip state of the second clutch CL2 and thereby prevent a change in vehicle acceleration caused by increase of the engine rotation speed Ne during the engine cranking. The control then proceeds to step S105.

At step S105, the convergence of slippage of the first clutch CL1 is judged. The control proceeds to step S106 when the convergence judgement is made by decrease of the slippage to an adequate level for actuation of the engine Eng. When the convergence judgement is not made, the control proceeds back to step S104.

After the complete explosion in the engine Eng, the first clutch CL1 is brought into full engagement at step S106. The control then proceeds to step S107.

At step S107, the second clutch CL2 is brought into full engagement. After that, the control proceeds to end.

[Setting of Drive Torque Upper Limit]

As shown in FIG. 11 the target engine torque/target clutch torque determination section 106 and the target clutch torque calculation section 107 control the motor torque Tmot and the transmission torque capacity of the second clutch CL2 for control of the drive torque.

For such drive torque control process, the integrated controller 10 has a drive torque upper limit setting part 600 (see FIG. 13) that sets a drive torque upper limit value Tdrlim as the upper limit of the drive torque during the slip control of the second clutch CL2.

The target engine torque/target clutch torque determination section 106 and the target clutch torque calculation section 107 are each provided with a slip control portion to allow slippage of the second clutch CL2 during the EV mode driving and during the engine start control.

The slip control of the second clutch CL2 is performed during the engine start by execution of the above-mentioned steps S101 and S104.

The slip control of second clutch CL2 is also performed during the EV mode driving. Namely, the slip control portion of the target clutch torque calculation section 107 allows slight slippage of the second clutch 2 from a point in the EV mode by maintaining the transmission torque capacity Tcl2 of the second clutch at a value equivalent to the maximum available drive torque in the EV mode. It is possible by such control to, at the time of decreasing the hydraulic engagement pressure of the second clutch CL2 to a slip engagement pressure during the engine start control, omit the time required to decrease from a full engagement pressure to a pressure value equivalent to the maximum available drive torque in the EV mode.

The drive torque upper limit value Tdrlim set by the drive torque upper limit setting part 600 is used for execution of the slip control and, at the same time, used as a second clutch torque upper limit value Tcl2lim during the slip control.

The configuration of the drive torque upper limit setting part 600 will be explained in more detail with reference to FIG 13.

Figure 13:
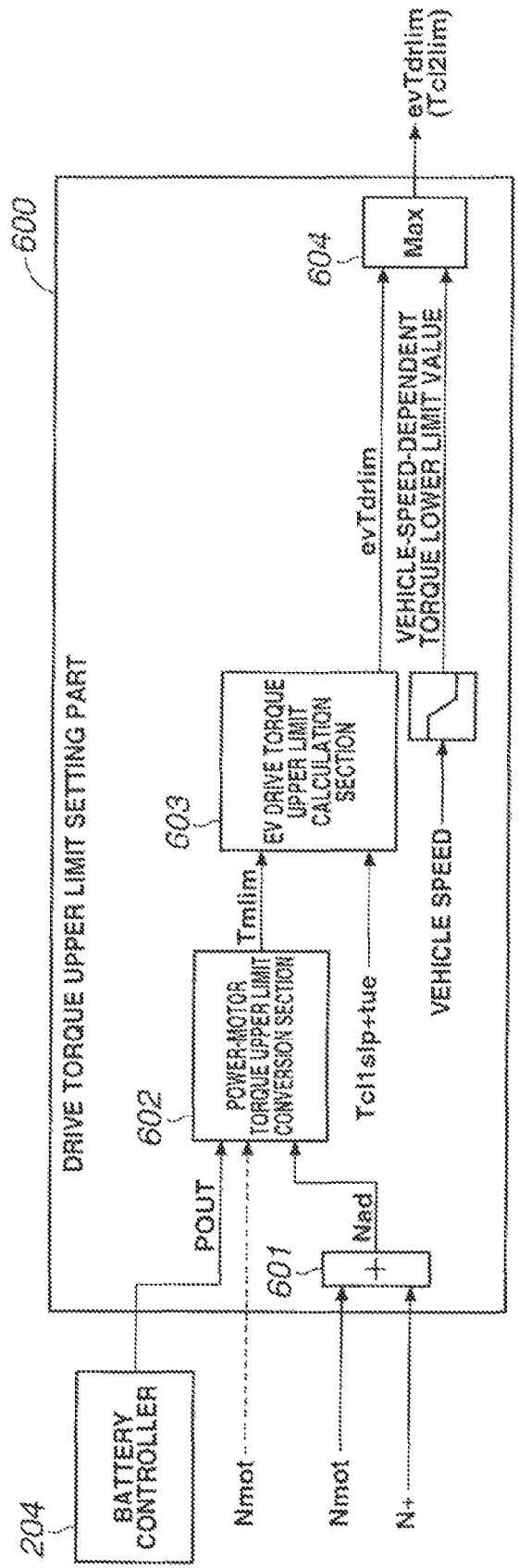
FIG. 13 is a configuration diagram of a drive torque upper limit setting part of the integrated controller.

As shown in FIG 13, the drive torque upper limit setting part 600 is configured to set an EV drive torque upper limit value evTdrlim as the upper limit of the drive torque in the EV mode. This drive torque upper limit setting part 600 has an adding section 601, a power-motor torque upper limit conversion section 602, an EV drive torque upper limit calculation section 603 and a comparing section 604.

The adding section 601 adds an additional rotation speed N+, which corresponds to an engine-starting slip rotation speed Nmer (see FIG. 16) as a rotation speed added for engine cranking during the engine start (i.e. for slippage of the second clutch 2), to the motor rotation speed Nmot. The resulting added motor rotation speed Nad is outputted from the adding section 601 to the power-motor torque upper limit conversion section 602.

The power-motor torque upper limit conversion section 602 receives not only the added motor rotation speed Nad from the adding section 601 but also an available power output Pout, which varies depending on the battery SOC, from the battery controller 204, and then, converts these input values to a motor torque upper limit value Tmlim.

Figures 14A, 14B:
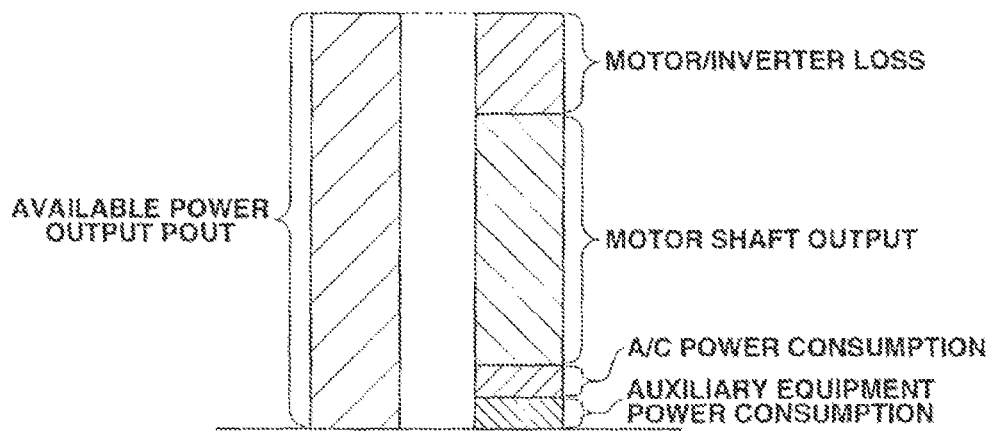
FIG. 14A is a torque upper limit map for conversion from an added motor rotation speed and an available power output to a motor torque upper limit value by a power-motor torque upper limit conversion section of FIG. 13.
FIG. 14B is a schematic diagram showing a relationship of a motor power consumption (motor shaft output) with the available power output in relation to the conversion from the added motor rotation speed and the available power output to the motor torque upper limit value by the power-motor torque upper limit conversion section of FIG. 13

This conversion is performed based on a torque upper limit map of FIG. 14A with the power consumption of the motor/generator MG on the vertical axis and the motor rotation speed on the horizontal axis.

As shown in FIG. 14B, the motor power consumption is a power for motor shaft output as determined by subtracting a motor/inverter loss, an A/C (air conditioner) power consumption and an auxiliary equipment power consumption from the available power output Pout information of the battery controller 204. The motor power consumption is assigned to the vertical axis of the torque upper limit map.

On the other hand, the added motor rotation speed Nad is assigned to the horizontal axis of the torque upper limit map of FIG 14A.

A value of intersection of the motor power consumption and the added motor rotation speed Nad on the torque upper limit map is determined as the motor torque upper limit value Tmlim. This motor torque upper limit value Tmlim is equivalent to a motor torque upper limit value crTmlim during the engine start control as the added motor rotation speed Nad is calculated by adding the additional rotation speed N+, which corresponds to the engine-starting slip rotation speed Nmer, to the motor rotation speed Nmot as mentioned above.

Referring back to FIG 13, the motor torque upper limit value Tmlim is outputted from the power-motor torque upper limit conversion section 602 to the EV drive torque upper limit calculation section 603.

The EV drive torque upper limit calculation section 603 calculates the EV drive torque upper limit value evTdrlim by subtracting, from the motor torque upper limit value Tmlim, the sum of a torque fluctuation Tue and a CL1 slip torque Tcl1slip as a slip torque of the first clutch CL1 during the engine start. The EV drive torque upper limit value evTdrlim is outputted from the EV drive torque upper limit calculation section 603 to the comparing section 604.

The comparing section 604 compares the EV drive torque upper limit value evTdrlim calculated by the EV drive torque upper limit calculation section 603 with a vehicle-speed-dependent torque lower limit value and sets either larger one of these torque values as the final EV drive torque upper limit value evTdrlim. As mentioned above, the EV drive torque upper limit value evTdrlim is also set as the second clutch torque upper limit value Tcl2lim during the slip control of the second clutch CL2 in the EV mode.

Although the drive torque upper limit setting part 600 for setting of the EV drive torque upper limit value has been explained above, the configuration for setting of a second clutch torque upper limit value during the engine start (i.e. engine-starting drive torque upper limit setting portion) is similar to above. Accordingly, the engine-starting drive torque upper limit setting portion will be explained below by referring to differences over the above configuration of the drive torque upper limit setting part 600.

For setting of the second clutch torque upper limit value during the engine start, the motor rotation speed Nmot is inputted, in place of the added motor rotation speed Nad, to the power-motor torque upper limit conversion section 602 as indicated by a dotted line in the drawing. Then, the output of the comparing section 604 is set as the second clutch torque upper limit value Tcl2lim.

The engine-starting drive torque upper limit setting portion is configured by modifying the configuration of the drive torque upper limit setting part 600 as mentioned above.

(Operations of Embodiment 1)

Figure 15:
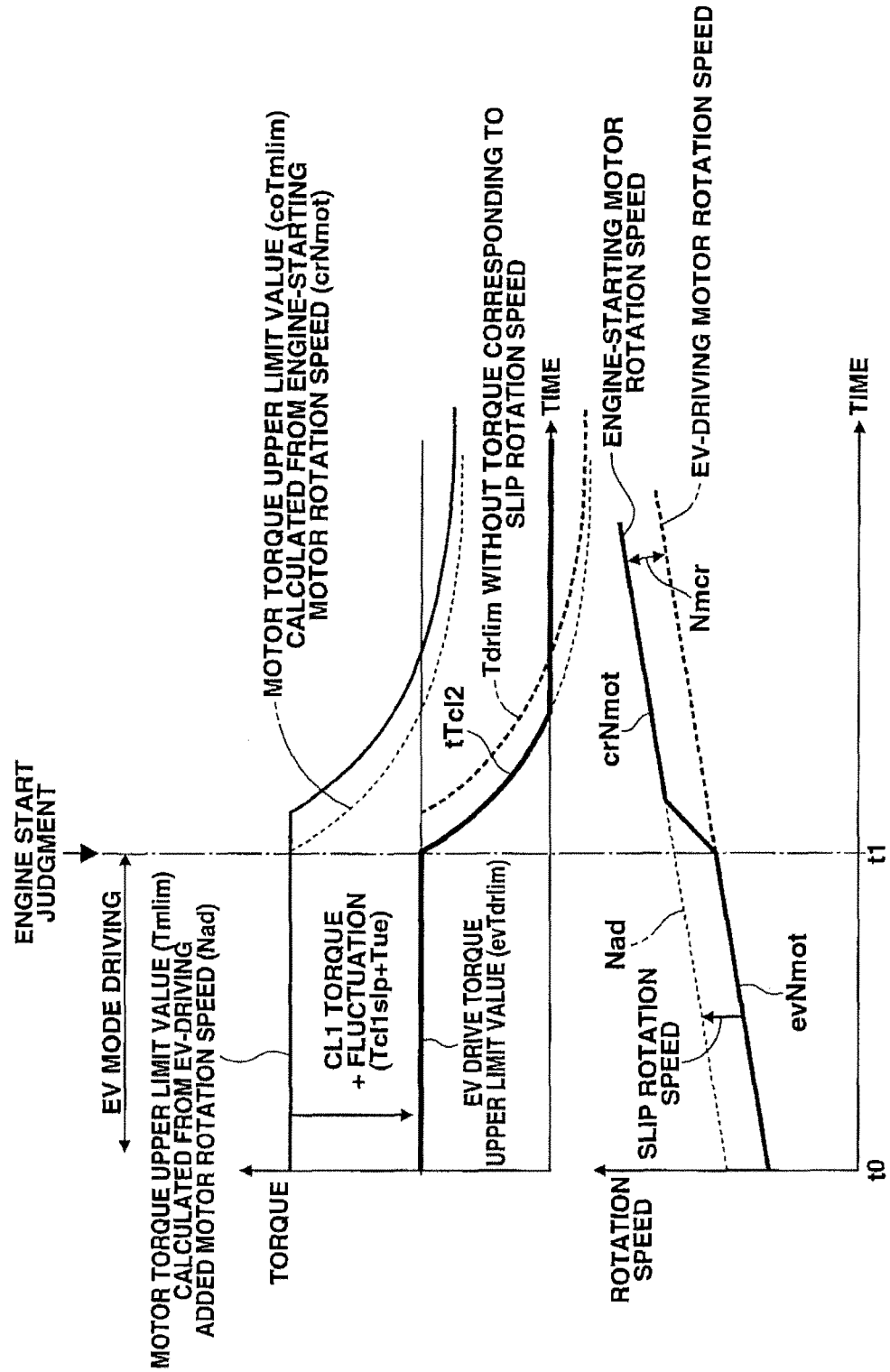
FIG. 15 is a schematic diagram showing operation characteristics for setting of a motor torque upper limit value during EV mode driving by an EV drive torque upper limit calculation section and a comparing section in the control device of the hybrid vehicle according to Embodiment 1.

FIG. 15 is a time chart showing operation examples of Embodiment 1.

The time chart refers to, by way of example, the case where the engine start control is initiated upon an engine start judgment at time t1 while the vehicle is driven in the EV mode from time t0.

In this case, the motor rotation speed Nmot is increased from an EV-driving motor rotation speed evNmot to an engine-starting motor rotation speed crNmot with the addition of the engine-starting slip rotation speed Nmer as indicated by a solid line in the drawing.

Figure 17:
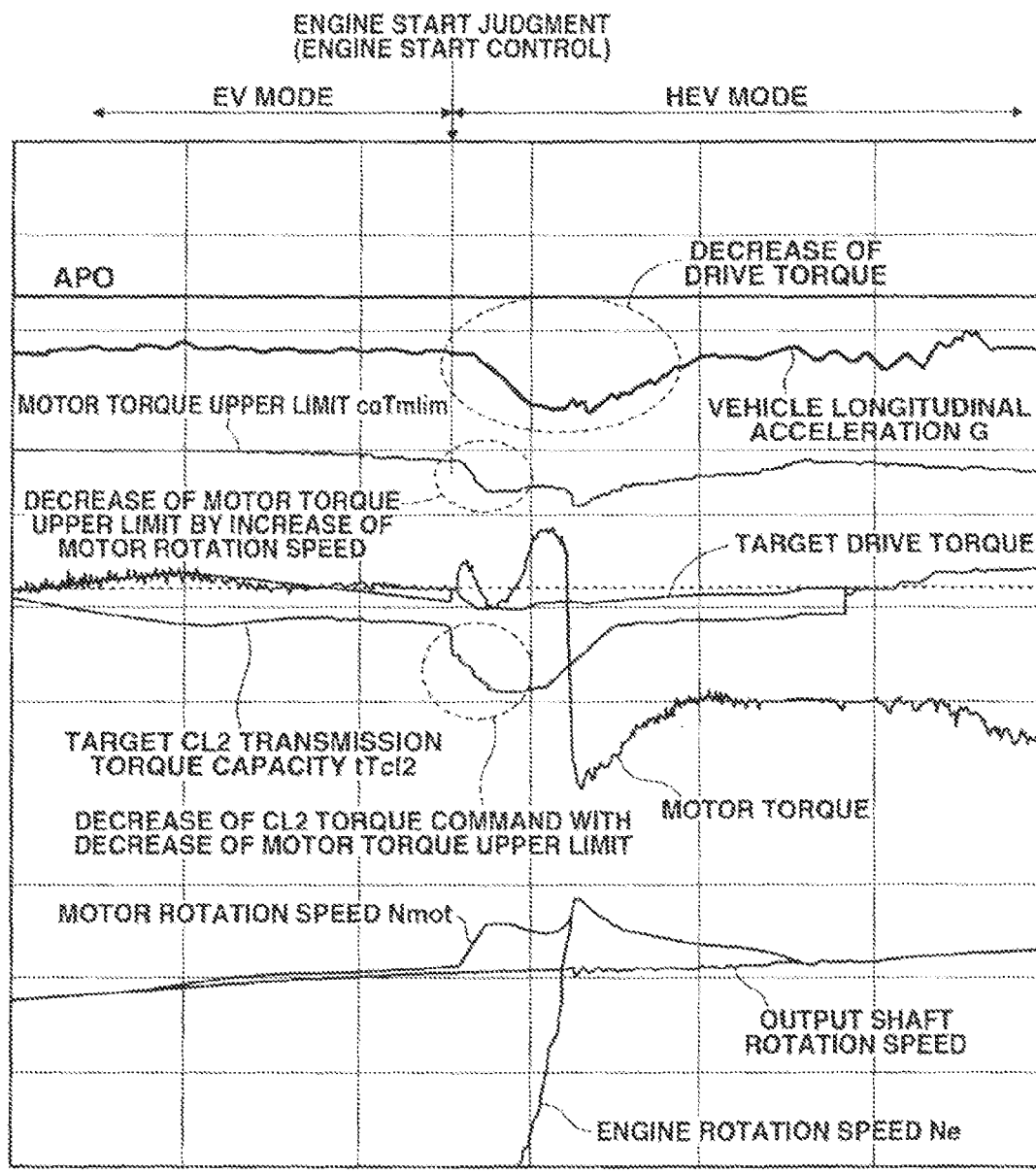
FIG. 17 is a time chart showing an operation example of Comparative Example as compared with the control device of the hybrid vehicle according to Embodiment 1.

FIG. 17 shows changes in motor rotation speed Nmot, motor torque upper limit value coTmlim, target second clutch transmission torque tTcl2 and the like in Comparative Example in the case where the engine start is performed from the EV mode as in FIG. 15. In Comparative Example, the motor torque upper limit value coTmlim is calculated from the EV-driving motor rotation speed Nmot and set as the motor torque upper limit value Tmlim in the EV mode.

In Comparative Example, the motor torque upper limit value coTmlim becomes smaller after the engine start judgment than before the engine start judgment as shown in FIG. 17 at the time of shifting from the EV mode to the HEV mode upon the engine start judgement.

The EV drive torque upper limit value, which is calculated based on this motor torque upper limit value coTmlim, thus becomes also smaller after the engine start judgment than before the engine start judgment in Comparative Example.

Due to such a decrease in drive torque, there arises a possibility that the vehicle longitudinal acceleration G varies as shown in the drawing. This leads to a change of vehicle behavior.

Next, the operations of Embodiment 1 will be explained below.

In Embodiment 1, the added motor rotation speed Nad is used for setting of the motor torque upper limit value Tmlim in the EV mode driving in the case where the motor rotation speed Nmot changes as shown in FIG. 15. This added motor rotation speed Nad is equal to the actual value of the motor rotation speed Nmot after the engine start judgment.

Further, the drive torque upper limit value Tdrlim is calculated by subtracting the slip torque Tcl1slp of the first clutch CL1 and the torque fluctuation Tue from the motor torque upper limit value Tmlim; and the minimum of the drive torque upper limit value Tdrlim is controlled to be 0 by the comparing section 604 in Embodiment 1.

The EV drive torque upper limit value evTdrlim is thus set as indicated by a thick solid line in FIG. 15 in Embodiment 1.

Figure 16:
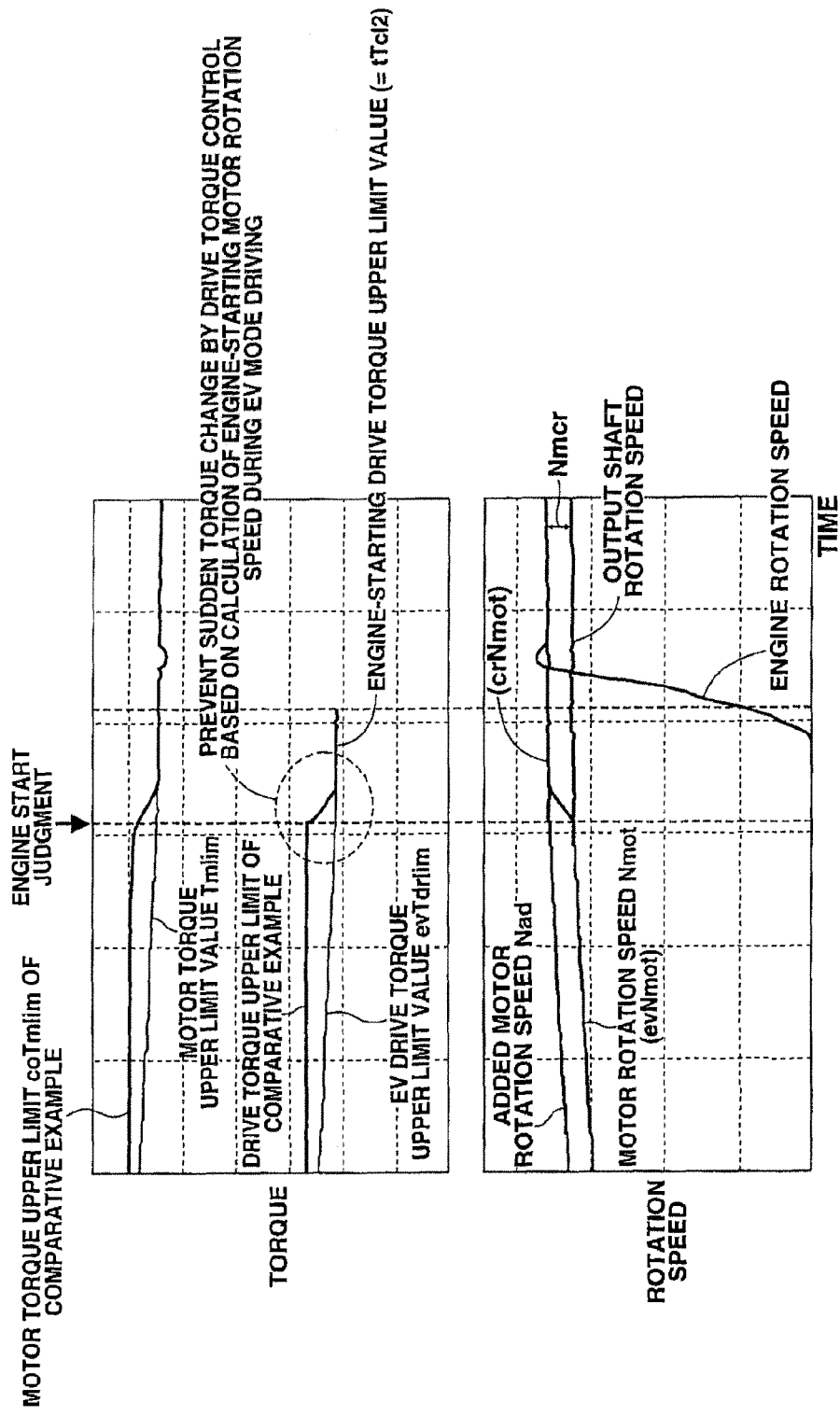
FIG. 16 is a time chart showing an operation example of the control device of the hybrid vehicle according to Embodiment 1.

FIG. 16 shows the operation example of Embodiment 1 where the EV drive torque upper limit evTdrlim is set as mentioned above.

As the added motor rotation speed Nad is used as the motor rotation speed for setting of the EV drive torque upper limit value evTdrlim, the EV drive torque upper limit value evTdrlim set in the EV mode becomes substantially equal to the target second clutch transmission torque capacity tTcl2 set as the drive torque upper limit value during the engine start as shown in FIG. 16. There thus occurs no variation in drive torque upper limit value before and after the engine start judgement.

It is therefore possible to suppress a variation in vehicle longitudinal acceleration G caused in Comparative Example and prevent a change of vehicle behavior caused by such a variation in vehicle longitudinal acceleration G.

(Effects of Embodiment 1)

The effects of Embodiment 1 will be explained below.

(a) The control device of the hybrid vehicle according to Embodiment 1 is structured as follows;

the hybrid vehicle comprises:

the engine Eng and the motor/generator MG as a vehicle drive-source;

the first clutch CL1 arranged between the engine Eng and the motor/generator MG in the drive torque transmission mechanism from the vehicle drive source to the drive wheels (left and right rear wheels RL and RR) to vary the transmission torque capacity therebetween; and the second clutch CL2 arranged between the motor/generator MG and the drive wheels (left and right rear wheels RL and RR) to vary the transmission torque capacity therebetween, and the control device comprises:

the engine start control part that performs engine start control to start the engine Eng from the EV mode, in which the vehicle is driven by drive force of the motor/generator MG with engagement of the second clutch CL2, by increasing the motor rotation speed of the motor/generator MG, while allowing slippage of the second clutch CL2, and bringing the first clutch CL1 into slip engagement; and the drive torque upper limit setting part 600 that sets the drive torque upper limit value Tdrlim in the EV mode based on the added motor rotation speed Nad, which is given by adding the additional rotation speed N+ to the motor rotation speed Nmot, as the upper limit of the drive torque transmitted to the drive wheels (left and right rear wheels RL and RR) through the second clutch CL2.

The drive torque upper limit value Tdrlim set by the drive torque upper limit setting part 600 in the EV mode becomes smaller than that set based on the motor rotation speed Nmot without adding thereto the additional rotation speed N+.

Even though the motor rotation speed Nmot is increased during the engine start, the drive torque upper limit value Tdrlim set based on the motor rotation speed Nmot during the engine start can be prevented from decreasing relative to that the above drive torque upper limit value set in the EV mode.

It is therefore possible to avoid a decrease in drive torque during the engine start control and prevent the occurrence of a drive torque variation before and after the engine start.

(b) In the control device of the hybrid vehicle according to Embodiment 1, the drive torque upper limit setting part 600 uses the engine-starting slip rotation speed Nmer, which is equivalent to the increase of the motor rotation speed Nmot during the engine start control, as the additional rotation speed N+.

In this case, it is possible to suppress a difference between the added motor rotation speed Nad before the engine start and the motor rotation speed Nmot during the engine start and reduce a difference in the motor torque upper limit values calculated from these respective rotation speed values so that a drive torque variation before and after the engine start can be effectively prevented from occurring due to a decrease in drive torque during the engine start control in the above configurations (a).

(c) In the control device of the hybrid vehicle according to Embodiment 1, the drive torque upper limit setting part 600 comprises: the power-motor torque upper limit conversion section 602 as a motor torque upper limit determination portion that determines the motor torque upper limit value Tmlim based on the added motor rotation speed Nad; and the EV drive torque upper limit calculation section 603 as an EV drive torque upper limit setting portion that sets the EV drive torque upper limit value evTdrlim in the EV mode by subtracting, from the motor torque upper limit value Tmlim determined by the power-motor torque upper limit conversion section 602, the sum of the torque fluctuation Tue and the torque Tcl1slp transmitted to the engine Eng through the first clutch CL1 during the engine start.

It is thus possible to set the EV drive torque upper limit value evTdrlim in the EV mode closer or equivalent to the drive torque upper limit during the engine start so that a drive torque variation before and after the engine start can be more effectively prevented.

(d) In the control device of the hybrid vehicle according to Embodiment 1, the power-motor torque upper limit conversion section 602 as the motor torque upper limit determination section portion determines the motor torque upper limit value Tmlim based on the added motor rotation speed Nad and the power output Pout available during the engine start control.

By consideration of the power output Pout available during the engine start control, it is possible to ensure the efficient drivability of the hybrid vehicle without limiting power consumption more than necessary and decreasing the frequency of selection of the EV mode by drive torque control.

(e) in the control device of the hybrid vehicle according to Embodiment 1, the drive torque upper limit setting part 600 comprises the engine-starting drive torque upper limit setting portion that sets the second clutch torque upper limit value Tcl2lim, as the upper limit value of the transmission torque of the second clutch CL2 during the engine start control, by subtracting the torque transmitted to the engine Eng through the first clutch CL1 at the engine start from the motor torque upper limit value Tmlim determined based on the motor rotation speed by the motor torque upper limit determination portion (power-motor torque upper limit conversion section 602).

Even when the rotation speed control of the motor/generator MG is performed during the engine start, it is possible to prevent a drive torque variation before and after the engine start by setting the transmission torque capacity of the second clutch CL2 equivalent to the drive torque upper limit determined by the engine-starting drive torque upper limit setting portion.

Although the present invention has been described with reference to the above specific embodiment, the present invention is not limited to such a specific embodiment. It is obvious to those skilled in the art that various modifications and changes of the embodiment described above are possible without departing from the scope of the following claims of the present invention.

For example, it is feasible to apply the present invention to a front-wheel-drive hybrid vehicle or all-wheel-drive hybrid vehicle although the present invention is embodied as the rear-wheel-drive hybrid vehicle in the above embodiment.

In the above embodiment, the engine-starting slip rotation speed is used as the additional rotation speed and added to the motor rotation speed for setting of the drive torque upper limit value in the EV mode. The additional rotation speed is not however limited to this value. The additional rotation speed may be a value close to but not equal to the engine-starting slip rotation speed. Even by addition of such an additional rotation speed, it is possible to effectively prevent a decrease in drive torque as compared with the conventional technology.

CROSS REFERENCE OF RELATED APPLICATION

The present application claims priority of Japanese Patent Application No. 2012-281902, filed on Dec. 26, 2012, the entire contents of which are hereby incorporated by reference.

The invention claimed is:

1. A control device for a hybrid vehicle, the hybrid vehicle comprising: an engine and a motor as a vehicle drive source; a first clutch arranged between the engine and the motor in a drive torque transmission mechanism from the vehicle drive source to drive wheels to vary a transmission torque capacity between the engine and the motor; and a second clutch arranged between the motor and the drive wheels to vary a transmission torque capacity between the motor and the drive wheels, the control device comprising:
an engine start control part that performs engine start control to start the engine from an EV mode, in which the hybrid vehicle is driven by drive force of the motor with engagement of the second clutch, by increasing a rotation speed of the motor, while allowing slippage of the second clutch, and bringing the first clutch into slip engagement; and
a drive torque upper limit setting part that sets a drive torque upper limit value based on an added motor rotation speed, which is given by adding an additional rotation speed to the rotation speed of the motor, as an upper limit of a drive torque transmitted to the drive wheels in the EV mode and as an upper limit of the transmission torque capacity of the second clutch.

2. The control device for the hybrid vehicle according to claim 1, wherein the drive torque upper limit setting part uses, as the additional rotation speed, a rotation speed equivalent to an increase of the rotation speed of the motor during the engine start control.

3. The control device for the hybrid vehicle according to claim 1, wherein the drive torque upper limit setting part comprises:
   a motor torque upper limit determination portion that determines a motor torque upper limit value based on the added motor rotation speed; and
   an EV drive torque upper limit setting portion that sets the drive torque upper limit value in the EV mode by subtracting, from the motor torque upper limit value determined by the motor torque upper limit determination portion, a torque transmitted to the engine through the first clutch at the start of the engine.

4. The control device for the hybrid vehicle according to claim 2, wherein the motor torque upper limit determination portion determines the motor torque upper limit value based on the added motor rotation speed and a power output available during the engine start control.

5. The control device for the hybrid vehicle according to claim 2, wherein the drive torque upper limit setting part comprises an engine-starting drive torque upper limit setting portion that sets a second clutch torque upper limit value as an upper limit of the torque of the second clutch during the engine start control by subtracting, from the motor torque upper limit value determined by the motor torque upper limit determination portion, the torque transmitted to the engine through the first clutch at the start of the engine.

* * * * *